Feb. 10, 1925.
W. A. STUBBS
FOOT MEASURING DEVICE
Filed Sept. 7, 1920
1,526,026
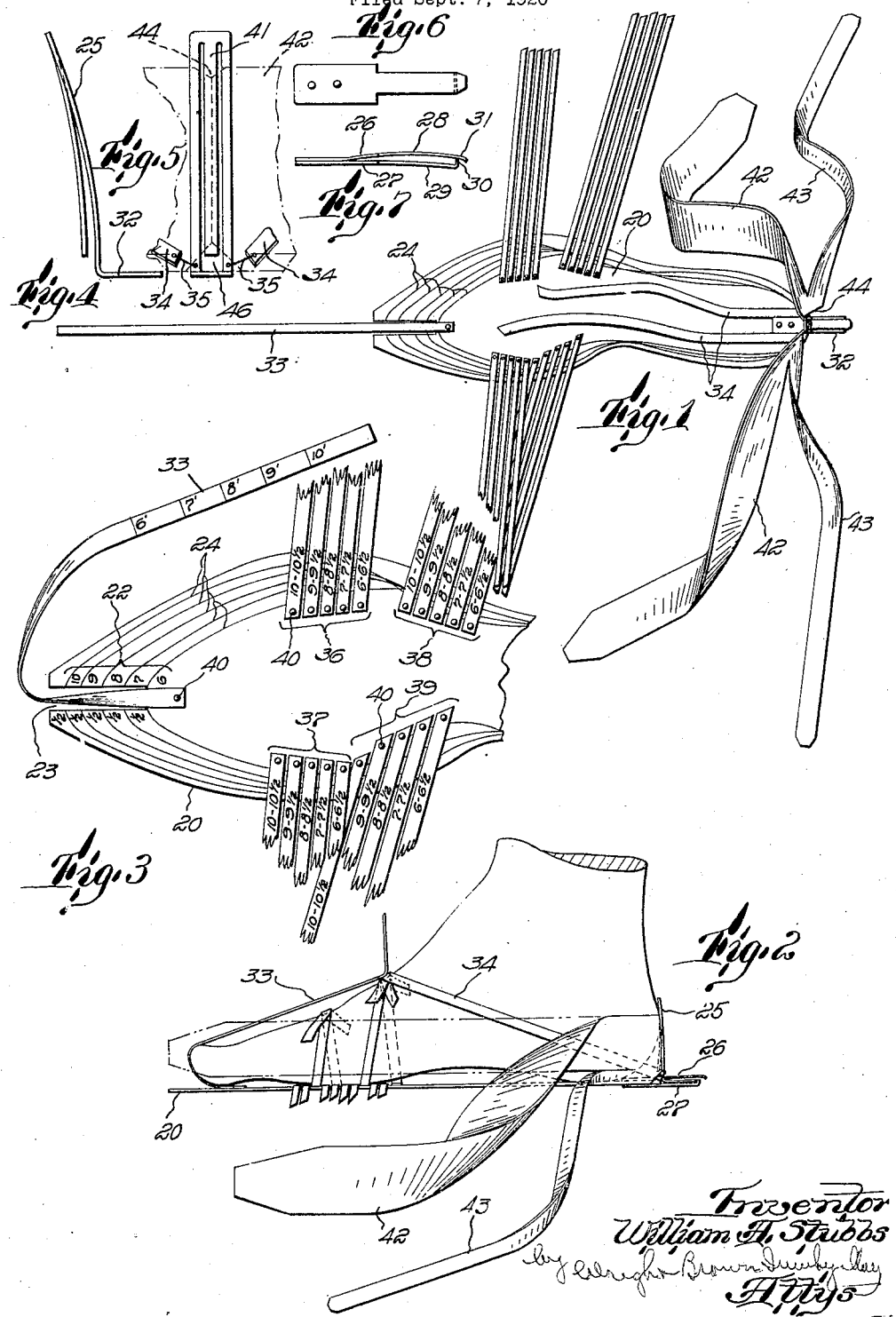

Patented Feb. 10, 1925.

1,526,026

UNITED STATES PATENT OFFICE.

WILLIAM A. STUBBS, OF SHERBROOKE, QUEBEC, CANADA.

FOOT-MEASURING DEVICE.

Application filed September 7, 1920. Serial No. 408,752.

*To all whom it may concern:*

Be it known that I, WILLIAM A. STUBBS, a citizen of the United States, residing at Sherbrooke, in the Province of Quebec and Dominion of Canada, have invented new and useful Improvements in Foot-Measuring Devices, of which the following is a specification.

The present invention relates to foot measuring devices, and particularly to devices of such nature that measurements may be made therewith by unskilled persons to aid in the proper fitting of the feet with shoes, and which is adapted to be sent out by mailing houses to prospective customers for the purpose stated.

The use of tapes in connection with patterns is well known. Usually in these devices either a tape is associated with a pattern so as to be moved to various parts thereof to measure various zones or regions of the foot, or tapes are fixed to the pattern at points convenient for measuring particular regions. These patterns are usable for measuring only one foot and are provided with no means for definitely indicating to what point or line the tapes are to be brought in measuring the various zones or regions of the foot, and only one tape is provided for measurement of each zone or region. With these devices it is usual to make the measurements with the tapes and to set down the record of such measurements on a separate sheet of paper with the resulting likelihood of error in recording the measurements.

Further objects of the invention are to provide means associated with the device whereby approximately the same portion of the same relative zones on various sized feet may be measured, and means for indicating a point or line to which said means may be brought in making such measurements.

A still further object of the invention is to adapt a single device for measuring both feet.

Specific means by which the above objects may be accomplished are disclosed in the accompanying drawings which disclose one embodiment of my invention. In this embodiment, a pattern is provided with a size scale and width lines indicated on both sides whereby, in connection with a reversible heel standard, the pattern may be used to measure both feet. In this embodiment are provided instep measuring tapes and groups of side tapes for measuring certain zones or regions in which groups there is a tape corresponding to each size within the range of measurement of the pattern and a central tape for indicating an arbitrary point to which the instep tapes may be brought and an arbitrary line to which said side tapes may be brought.

In the drawings:

Figure 1 is a plan view of the pattern with tapes and a heel brace attached, showing the face thereof used in measuring the right foot.

Figure 2 shows the device as applied to a foot in measuring the same.

Figure 3 is a detail view showing the relation of the tapes on the fore part of the pattern.

Figures 4 and 5 show in different aspects the standard detached.

Figures 6 and 7 show different aspects of the clip.

Referring to the drawings in detail, the same parts being designated by the same reference numerals in all views, 20 designates a pattern which is in the general shape of a shoe sole, at the toe end of which is laid off a scale 22 for measuring the length of the foot, the gradations of the scale being equal to the difference in length of one size of shoe and the next larger size, and the number of gradations being limited only by the length of the pattern. As shown there are five gradations and as many half gradations making the range of measurement five and a half sizes, the gradations lying between the sizes six and ten and a half, though, of course, the size gradations are according to whether the pattern is for men's, women's, misses', boys' or children's shoes. The full size gradations are indicated on one side of a notch 23 cut for a purpose which will later appear, in the toe end of the pattern. Corresponding to and starting from each size gradation on scale 22, there are width lines 24 extending about and within the margin of the pattern which are to be used in indicating the width of the shoe, and at the heel end is secured a standard 25 of any suitable material, preferably of metal, against which the heel of the foot may be placed in making measurements.

The size scale and width lines occur on both sides of the pattern and the standard 25 is made reversible so that both feet may be measured by simply reversing the standard on the pattern. The surface of the standard is preferably curved longitudinally to fit the heel and the means by which the standard is reversibly attached to the pattern comprises a clasp formed by two plates 26 and 27, preferably of spring metal, secured to the pattern by rivets or the like to one on each face of the pattern and having narrow tongues 28 and 29 extending rearwardly from the pattern in parallel planes.

One of the tongues has an upstanding stop lug 30 at its end and the other is provided with an overhanging portion 31 which may be grasped to spread the tongues apart for removing or inserting the standard. The standard 25 is provided with a flat rearwardly extending base plate 32 which is adapted to be grasped by the spring tongues of the clasp with the rear end of the plate abutting against the stop lug 30. When it is desired to remove the standard 25 from the clasp, it may be readily accomplished by simply raising the overhanging portion of tongue 31 with the thumb nail and removing the plate 32.

On one face of the pattern, as shown on the face thereof designed to measure the right foot, are secured tapes for measuring certain zones or regions of the feet. These tapes comprise, as shown, instep measuring tapes 34, and groups of tapes 36 and 37 for measuring the zone of the ball of the foot, and groups of tapes 38 and 39 for measuring the zone of the waist of the foot. Obviously the zones to be measured are arbitrarily selected and tapes may be provided to measure other zones than those described.

The instep measuring tapes 34 are secured to the lower end of the standard 25 by suitable means as by loops of wire 35 passed through apertures formed in the standard, and are adapted to be drawn about the instep to measure that zone or region.

The groups of tapes 36 and 37 are secured to the pattern adjacent both edges and in the region where the ball of the foot will rest on the pattern. These tapes may be known as "ball tapes." Similarly the groups 38 and 39 are arranged adjacent the edges of the pattern in the region where the shank or waist of the foot will fall and may be called "waist tapes." In each of these groups there is one tape for each size number of the scale 22, marked to correspond with the gradation on the scale and arranged in the same order as the gradations on the scale. These tapes are designed to be used to measure the feet in their respective zones or regions, only the tapes being used in any case which correspond with the size as found on the scale 22 in measuring the foot. The measurements may be marked directly or the tapes cut off at these points and unused tapes in these groups may be cut off close to the pattern.

A tape 33 which may be called the "toe tape," is secured to the pattern preferably just within the toe end of the shortest sole measurement indicated on scale 22 and in position to be passed through notch 23 when used in connection with the opposite face of the pattern on which it is attached. The toe tape is provided with gradations corresponding with the gradations on scale 22, and are spaced apart such distances that a gradation thereon may be selected to correspond to the size found on scale 22, for indicating an arbitrary point on the instep of the foot to which the instep measuring tapes may be brought. The tape 33 may also be used to indicate an arbitrary line to which the ball tapes and the waist tapes may be brought in measuring their respective zones.

The pattern is preferably made of flexible material as kraft paper and the toe tape, the ball tapes and the waist tapes may be secured to one side only of the pattern in any suitable way as by rivets or staples 40. The flexibility of the pattern adapts it to measuring of both feet with the same set of tapes as the pattern may be reversed and may be bent about the foot without materially lengthening the tape.

The standard 25 is provided with a longitudinal slot 46 formed therein centrally of which extends a tongue 41 secured at one end and free at the other. In the slot may be secured tapes 42 for indicating the location of large joints, corns, bunions, and the like, on one edge of which are narrow tapes 43 which may be attached thereto or be integrally formed therewith and which are designed to locate callous places and other abnormalities on the bottom of the foot. The tapes 42 may be made in one piece or of two pieces sewed together as shown and notches 44 may be formed therein (see Fig. 5 in dotted lines) at the center to assist in keeping the portions of the tape of the same length on both sides of the standard.

In making measurements of the foot, the standard 25 is placed in the clip in the manner previously described with the standard extending upwardly when the pattern is placed on a support with the face up, upon which the measurements are to be made. When so placed, the toe tape 33 should extend forwardly and the groups of tapes 36, 37, 38 and 39 should extend outwardly from the edges of the pattern with the person's heel contacting with the curved surface of the standard. In this position, the great toe will fall on one of the size gradations of the scale and the size of the foot may be indicated by marking the gradation with a pencil. Similarly the width of the foot may be indicated by marking with a pencil on either side of the foot, canting the pencil to the right or left, as the case may be, so as to bring the point of the pencil directly under the foot line. The pencil point will in such case strike the width line desired for the shoe.

The arbitrary point on the instep to which the instep tapes are to be brought may be located after the size of the foot has been found on the size scale, say size seven, by bringing the toe tape to the gradation two sizes larger on the scale—i. e. the grade for size nine, and crimping down the tape at this point. The toe tape is then drawn back over the foot and the instep tapes 34 are drawn about the instep to meet the toe tape at the point indicated by the gradation nine thereon. The instep tapes are marked at the points where they meet the toe tape, or if only one foot is to be measured may be cut off at these points. The ball and waist zones may be measured in a similar manner by drawing the ball and waist tapes corresponding to the size found—i. e. the size nine in the supposed case above, up about the foot to meet the line of the toe tape and may be marked at these points or cut off as desired. In case the tapes are cut off, measurements of the ball and waist zones of the other foot may be made with the next tape to the one used to measure the first foot, without appreciable variation from the true measurement of the respective parts and these tapes may also be cut off at the point where they meet on the toe tape. The unused tapes of the ball and waist groups of tapes may be then cut off close to the pattern.

The position of large joints, bunions and the like may be indicated on the tape 42 drawing the tape about the side of the foot thereon and properly designating the position of the joints etc. Similarly the narrow tapes 43 may be passed under the foot and callous places and the like on the sole thereof, indicated thereon.

In the device as described above, possibility of error is practically eliminated by the use of the central tape to designate an arbitrary line and groups of side tapes 36, 37, 38 and 39 which may be brought to this line and on which the various measurements may be marked. The device is sent back to the mailing house with the measurements marked thereon, instead of, as is usual in ordinary practice, transferring the measurements to a separate sheet. The marking of width lines on both sides of the pattern and the provision of a reversible standard at the heel adapt a single pattern to use in measuring both feet.

The device is of simple and inexpensive construction being preferably cut out of a sheet of heavy paper (e. g. kraft paper) and the tapes may be of paper or cloth, with no metal except the standard, and clip for standard in place. So constructed, the device may be readily packed in small space and sent through the mail, at a trifling cost. These and other advantages adapt the device to use of mailing houses and other firms doing business at a distance from their customers.

What I claim is:

1. A device for measuring feet comprising a sole-shaped pattern having size graduations thereon adapted to be used in reversed position to measure both the right and the left foot of an individual, said pattern having a size scale and width lines on both sides thereof.

2. A device for measuring both feet of an individual, comprising a pattern shaped like the sole of a shoe, and having a size scale and width lines on both faces of said pattern, a reversible abutment at the heel, and a tape attached to the forward region of one side of the pattern, said pattern having a slot cut in its forward portion through which the tape may be passed to make measurements on the side of the pattern opposite to that on which the tape is attached.

3. A device for measuring both feet of an individual, comprising a pattern shaped like the sole of a shoe, and having a size scale and width lines on both faces of said pattern, a reversible abutment at the heel, and a tape attached to the forward region of one side of the pattern, said pattern having a slot cut in its forward portion through which the tape may be passed to make measurements on the side of the pattern opposite to that on which the tape is attached and groups of tapes on said device for measuring various parts of the foot.

4. A device for measuring the foot comprising a pattern shaped approximately like the sole of a shoe, a scale having gradations for each size of shoe measurable by the device, each gradation being designated by the number of its size, side tapes arranged in groups for measuring certain regions of the foot, each group comprising a number of tapes corresponding to the number of sizes measurable by the pattern and designated by the number of the size to which it corresponds.

5. A device for measuring feet, comprising a pattern, a size scale and width lines on both faces of said pattern, and a reversible abutment at the heel end of the pattern.

6. A device for measuring feet, comprising a pattern having a size scale and width lines on both sides thereof, the pattern having a notch in the forward end, a toe tape attached to the pattern adjacent said notch and adapted to be passed through said notch, and instep measuring tapes on said pattern.

7. A device for measuring the foot, comprising a sole-shaped pattern, a central tape for locating an arbitrary point on the instep, and instep measuring tapes, the ends of which are adapted to be brought to the point so found to measure the instep.

8. A device for measuring the foot, comprising a sole-shaped pattern, size gradations on the forward end of the pattern, instep measuring tapes, and a tape attached to the pattern adjacent the forward end and being provided with gradations so placed thereon that, when the size of a foot has been ascertained, the tape may be used to indicate a point on the foot to which the instep measuring tapes may be brought to measure the instep.

9. A device for measuring the foot, comprising a sole-shaped pattern having side gradations thereon, a central tape adapted to be passed back over the foot from the toe to the instep, and side tapes arranged in groups, corresponding in number and arranged in sequence of the size gradations on the device and positioned to be brought up to meet said central tape.

10. A device of the character stated, comprising a pattern, a tape secured to the pattern to extend longitudinally thereof and adapted to be drawn back over the toes on substantially the center line of a foot resting on the pattern, and a second tape secured to the pattern to extend laterally therefrom and adapted to be brought about the foot to the first said tape to measure the transverse dimension of a certain zone of the foot.

11. A device of the character stated, comprising a pattern, a tape secured to the pattern to extend longitudinally thereof and adapted to be drawn back over the toes on substantially the center line of a foot resting on the pattern to the instep, and a plurality of tapes secured to the pattern to extend laterally therefrom and adapted to be brought about the foot to the longitudinal tape to measure the transverse dimensions of different zones of the foot.

12. In a device for measuring the foot, a pattern, a standard attached at the heel end of said pattern, said standard having a slot formed therein and a tongue in said slot, tapes in said slot positioned to be drawn about the sides of the foot for recording the location of joints, bunions and the like on the sides of the foot and tapes for recording the location of callouses and the like on the bottom of the foot.

13. A device for measuring the foot comprising a member on which the foot may rest, a tape fixed to said member in position to extend upward from the toes and to be brought back over a foot resting on said member, and other tapes fixed to said member on which the foot rests and adapted to extend laterally in substantially opposite directions from said member and to be brought under the sides and over the top of the foot to meet said first mentioned tape.

In testimony whereof I have affixed my signature.

WILLIAM A. STUBBS.